No. 630,333. Patented Aug. 8, 1899.
S. W. DIETRICH.
DIPHASE ELECTRIC MOTOR.
(Application filed Nov. 8, 1898.)
(No Model.) 2 Sheets—Sheet 1.
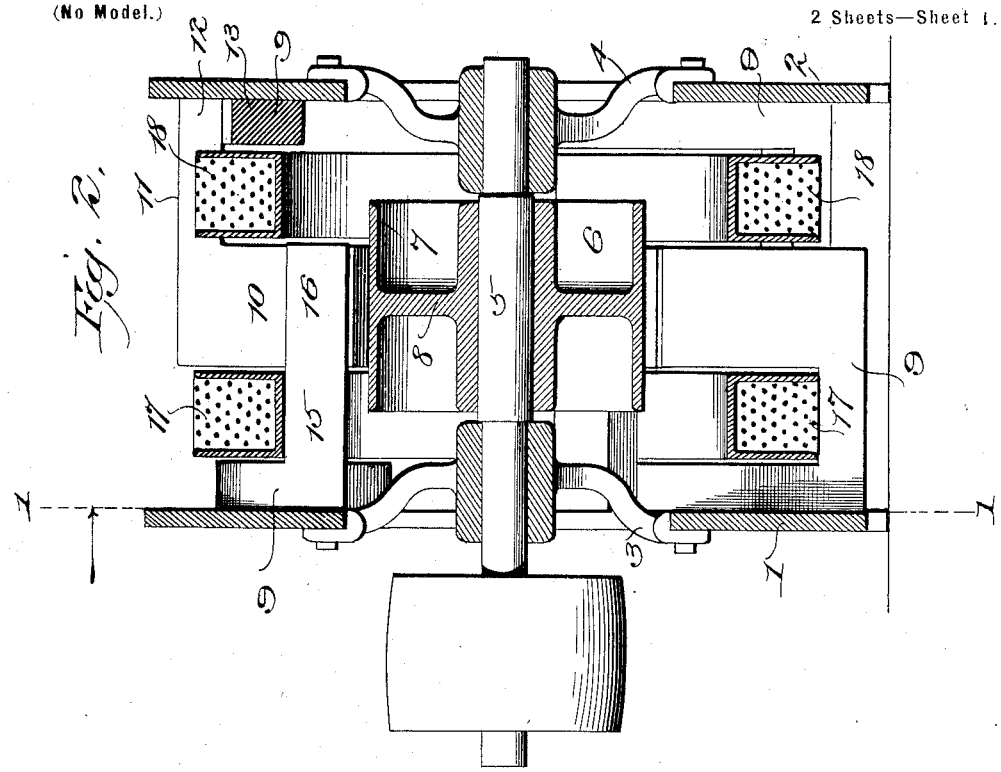
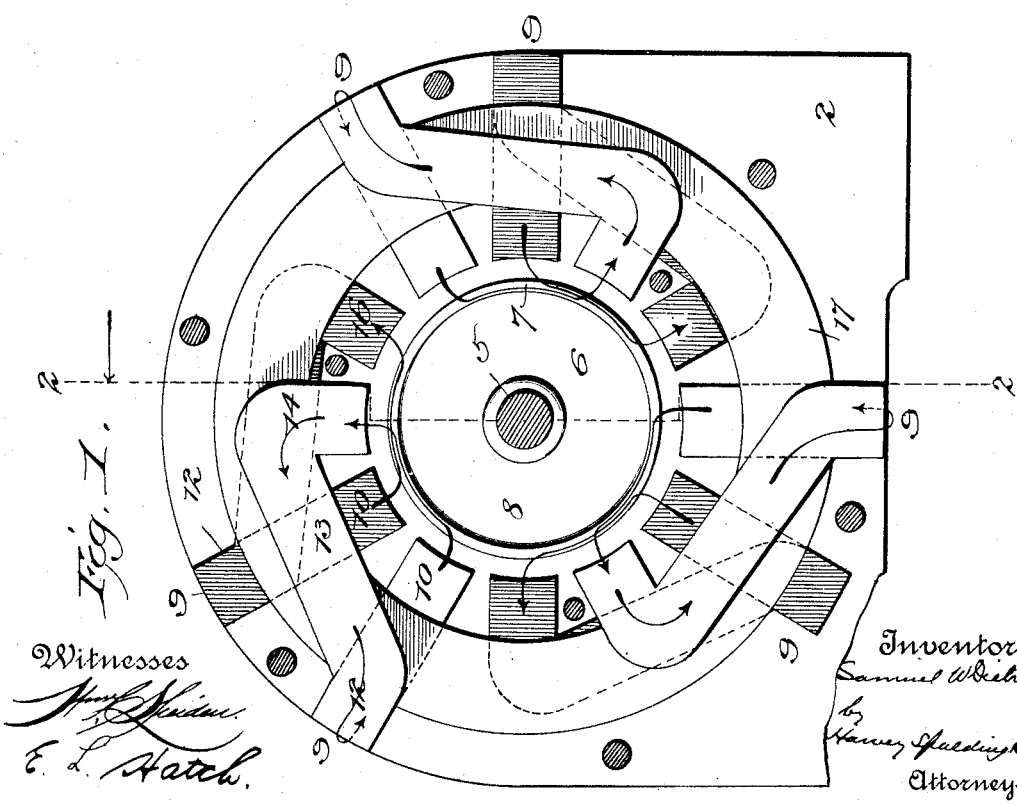
Witnesses
Inventor
Samuel W Dietrich
by
Harvey Spaldington
Attorneys No. 630,333. Patented Aug. 8, 1899.
S. W. DIETRICH.
DIPHASE ELECTRIC MOTOR.
(Application filed Nov. 8, 1898.)
(No Model.) 2 Sheets—Sheet 2.
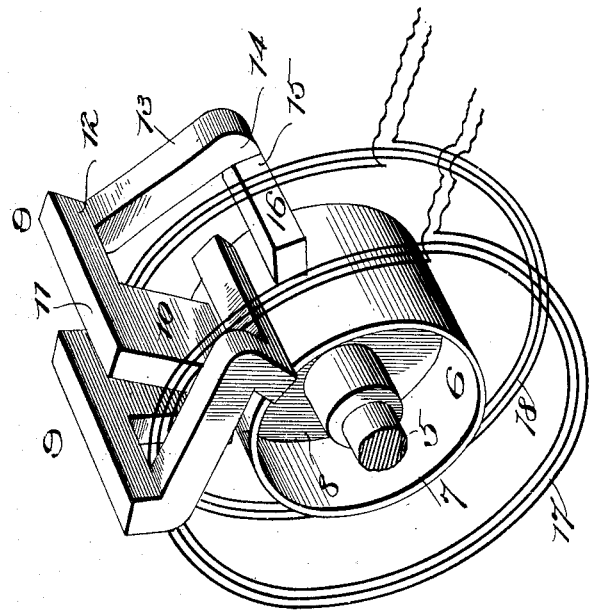
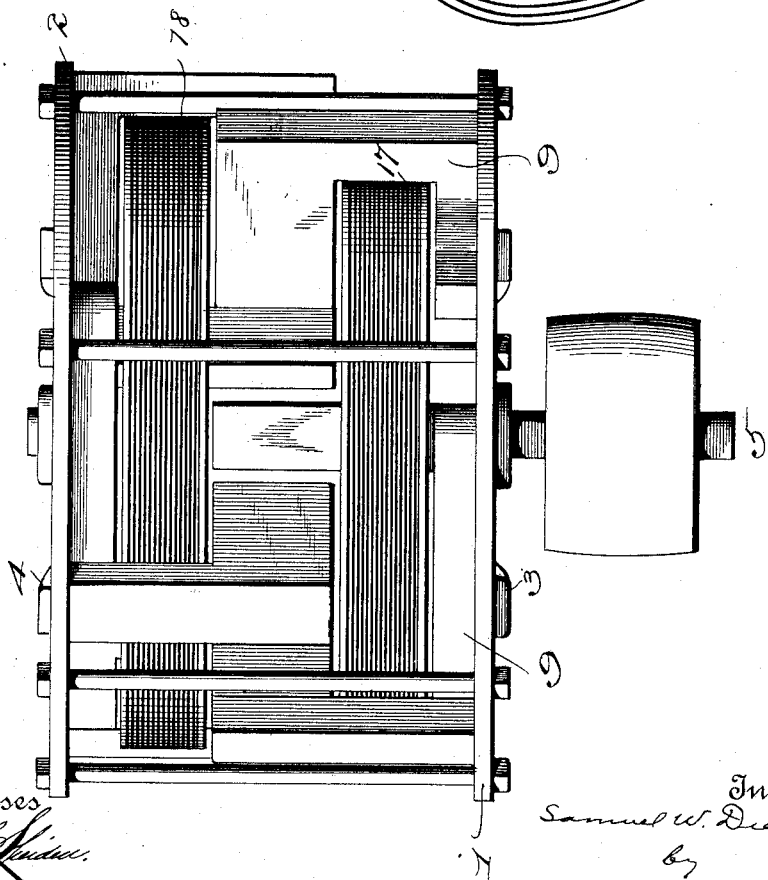
Witnesses
Inventor
Samuel W. Dietrich
by
Harvey Spalding & Sons
Attorneys

UNITED STATES PATENT OFFICE.

SAMUEL W. DIETRICH, OF TERRE HAUTE, INDIANA, ASSIGNOR OF FORTY-NINE ONE-HUNDREDTHS TO ROBERT W. BEEBE, OF SAME PLACE.

DIPHASE ELECTRIC MOTOR.

SPECIFICATION forming part of Letters Patent No. 630,333, dated August 8, 1899.

Application filed November 8, 1898. Serial No. 695,883. (No model.)

*To all whom it may concern:*

Be it known that I, SAMUEL W. DIETRICH, a citizen of the United States, residing at Terre Haute, in the county of Vigo and State of Indiana, have invented certain new and useful Improvements in Diphase Electric Motors; and I do hereby declare the following to be a full, clear, and exact description of the invention, such as will enable others skilled in the art to which it appertains to make and use the same.

In diphase electric motors as generally constructed with the field comprising suitably-wound salient poles all of which are magnetically connected together by the frame of the machine the loss occasioned by reversals of the magnetic flux in the armature is very considerable, being due to the magnetic connection of the field-poles, which causes the magnetic flux to divide at the pole-faces and thread the armature in opposite directions, one part passing through the armature in one direction to an adjacent field-pole of opposite polarity and the remainder going in an opposite direction to another pole of opposite polarity.

The present invention relates to diphase motors and is designed to overcome reversals of the flux in the armature, as set forth, as well as other defects generally existing in alternating-current motors, such as induction of false or counter currents in the system, eddy or wash currents in the field, and undue heating of the coils. The present construction is intended further to effect a marked reduction in weight and size of the parts and cost of manufacture and to generally increase the efficiency of motors of this type.

In the present invention the field consists of two sets of magnets of peculiar construction, each magnet having two active poles presented to the armature and constituting in connection with the latter a complete magnetic circuit by itself, two field-coils, one for each set of magnets, intended to be connected, respectively, with the two phases of an operating-current having a phase difference of a quarter-cycle or ninety degrees. The poles of one set of magnets alternate, considered circumferentially of the armature, with those of the other set, and the field-coils are so disposed relatively of the sets of magnets that one coil excites or magnetizes one entire set of magnets and the remaining coil the remaining set, thus producing the two independent fields corresponding to the two phases. This provision of a plurality of independent magnets (three in each field in the present instance) all similarly magnetized produces complete independent magnetic circuits, the fluxes of which thread the adjacent portion of the armature in the same direction considered circumferentially, and prevents any division of the flux at the pole-faces and periodic reversals of magnetism in the armature, which occasion such loss in the ordinary type of diphase motor. Not only will such a construction prevent magnetic reversals in the armature, but it will also reduce to a minimum the generation of false or counter currents in the system in which the machine is located, thereby rendering of no practical importance a fault common to motors of this class. As a result of this improved field construction, a solid-rimmed iron armature, devoid of windings or coils of any character, can be employed, and by reason of the absence of magnetic reversals therein a smaller quantity of iron will satisfy all requirements without undue heating, thus reducing the weight and obviating the necessity of using the usual expensive wound and laminated structure. A further advantage gained by the use of an armature having the minimum quantity of metal is that the resistance to periodic magnetic currents is heightened, thus reducing self-induction in the armature. By reason of the great radiating surface presented by a field of this character a higher magnetic density and a smaller quantity of iron can be used, thus not only reducing the weight and cost, but also materially diminishing the "wash" or loss in the field due to eddy-currents, as they are practically prevented by the increased resistance of the metal to the flow due to the higher temperature at which safe operation can be had. The size of the field-coils and their complete exposure combine, when wire of proper cross-sectional area is employed, to reduce their internal heat to a minimum, which enables them to keep cool even when the metal is at a comparatively high temperature.

In the accompanying drawings, Figure 1 is a side elevation; Fig. 2, a cross-sectional elevation; Fig. 3, a plan, and Fig. 4 a diagrammatic view.

The motor-frame consists of annular side plates 1 and 2 and spiders 3 and 4, bolted thereto, which have bearings for a shaft 5, which carries an armature 6. This armature is of iron and consists of a broad comparatively thin band 7 and a web or spokes 8, connecting it to a hub suitably secured to the shaft. The construction of the armature is very similar to that of a large band-pulley, and the employment of this type of solid-iron armature, the advantages of which have been set forth heretofore, is made possible by reason of the improved field employed.

The two fields are each composed of independent magnets 9, the magnets of one phase being suitably secured to plate 1 and those of the other phase to plate 2. The respective magnets of the sets are disposed at regular intervals apart around said plates, considered circumferentially thereof, three magnets being employed in each field in the present instance, and those of one field are so disposed relatively of those of the other field that the poles presented to the armature by the magnets of one phase interlace or alternate with those of the other phase. The magnets are all of the same peculiar shape, and hence a description of one only will be given. One pole 10 of the magnet extends radially from the armature (the air-gap being small) and is then bent and extended laterally at 11 and again extended radially of the armature in toward the same for a short distance, as at 12. From this point it extends alongside the annular plate (either 1 or 2, as the case may be) to which it is secured substantially tangential to the armature (and the field-coils, described presently) for a suitable distance, as at 13, and is then again extended radially toward the armature at 14 and terminated in the horizontal piece 15, having a polar extension 16, which lies in the same vertical plane with pole 10. All the poles of both sets of magnets lie in the same plane, and the arrangement is such that considered circumferentially of the armature a pole 10 of a magnet of one field is followed by a pole 10 of a magnet of the other field. A pole 16 of a magnet of one field is next presented to the armature and followed by a similar pole of a magnet of the remaining field. Two more poles 10 are then presented, and so on.

The coils for exciting the magnets are shown at 17 and 18, coil 17 serving to magnetize one entire field and coil 18 the other field, said coils being designed for connection with the respective phases of a suitable generator having a phase difference of one-quarter cycle or ninety degrees. The coils, which are wound on suitable bobbins or rings, pass in between pole 10 and part 13, under part 11, and over extension 15 of each magnet in the given field, the peculiar form of the magnets assisting in the proper retention of the coils. This relative disposition of the coils and individual magnets results in the magnetization of the latter in the same direction as indicated by the arrows in Fig. 4, where the magnetic flux is shown to pass from poles 10 through the adjacent sections of the armature-rim to poles 16 and back through the magnet to poles 10 again. It will be seen that each magnet constitutes by itself an independent magnetic circuit which is completed through that portion of the armature-rim nearest and between its poles and that the fluxes all thread the armature in the same direction and with those of one phase crossing or interlacing those of the other phase. This renders reversals in the direction of passage of the flux through the armature impossible, particularly when the armature is up to speed, and the incident losses so common in the ordinary type of diphase motor are obviated, because, owing to the independence of the magnets and magnetic circuits, division of the flux at the pole-faces, as previously described, cannot occur.

In the present machine the magnetization of the armature by the poles of either phase is always in a progressive manner in one direction, and the efficiency is consequently very high, there being no losses by magnetic reversals. Further direct results of the improved construction provided are absence of eddy-currents in the fields and false currents in the system, coolness of the field-coils, owing to their exposure, lightness and cheapness of the parts, and generally the absence of the various faults and losses found in alternating-current motors.

In the smaller sizes of motor the solid armature, as described, will be employed; but with an increase of horse-power it may be found desirable to employ a wound and laminated armature and collector-rings and brushes.

Having thus described my invention, what I claim as new, and desire to secure by Letters Patent, is—

1. In a motor, a field-magnet system composed of bipolar magnets isolated from each other and each having both poles presented to the armature-space one ahead of the other, considered circumferentially thereof, and a single coil positioned relatively of the magnets to magnetize all of them.

2. In a motor, a field-coil, and a plurality of bipolar magnets isolated from or independent of each other, each of which straddles the coil and has its poles located one ahead of the other considered circumferentially of the armature-space.

3. In a motor, a field-magnet system composed of a plurality of independent or isolated magnets each having two connected polar pieces presented to the armature-space one ahead of the other, considered circumferentially thereof, and a single exciting-coil for all the magnets, which passes under one polar piece and over the other of each magnet.

4. In a motor, two sets of field-magnets, each set being composed of a plurality of independent magnetic circuits in all of which the direction of the flux is the same.

5. In a motor, two sets of field-magnets, each set being composed of a plurality of independent magnetic circuits interlacing or crossing those of the other field-magnets and in all of which the direction of the flux is the same.

6. In a motor, two sets of field-magnets, each set consisting of magnets isolated from each other, and coils for the respective sets, one of which is adapted for exciting all the magnets of one set and the other coil for exciting all those of the other set.

7. In a motor, two sets of field-magnets, each set being composed of a plurality of bipolar magnets which are isolated from each other and each magnet having its poles disposed one in advance of the other considered circumferentially of the armature, the individual magnets of the respective sets being so arranged that each pole of each magnet of each set is located in between two adjacent poles of the magnets of the other set, and means for exciting the magnets of the respective sets.

8. In a motor, two sets of field-magnets, each set being composed of independent or isolated bipolar magnets, whose polar pieces are presented to the armature-space one ahead of the other, considered circumferentially thereof, and the poles of one set being alternated in position in respect of those of the other set, and independent exciting-coils for the two sets, one coil passing under one pole and over the other pole of each magnet of one set and the other coil being similarly disposed in relation to the magnets of the remaining set.

In testimony whereof I affix my signature in presence of two witnesses.

SAMUEL W. DIETRICH.

Witnesses:
GEORGE M. DAVIS,
STEPHEN M. REYNOLDS.